UNITED STATES PATENT OFFICE.

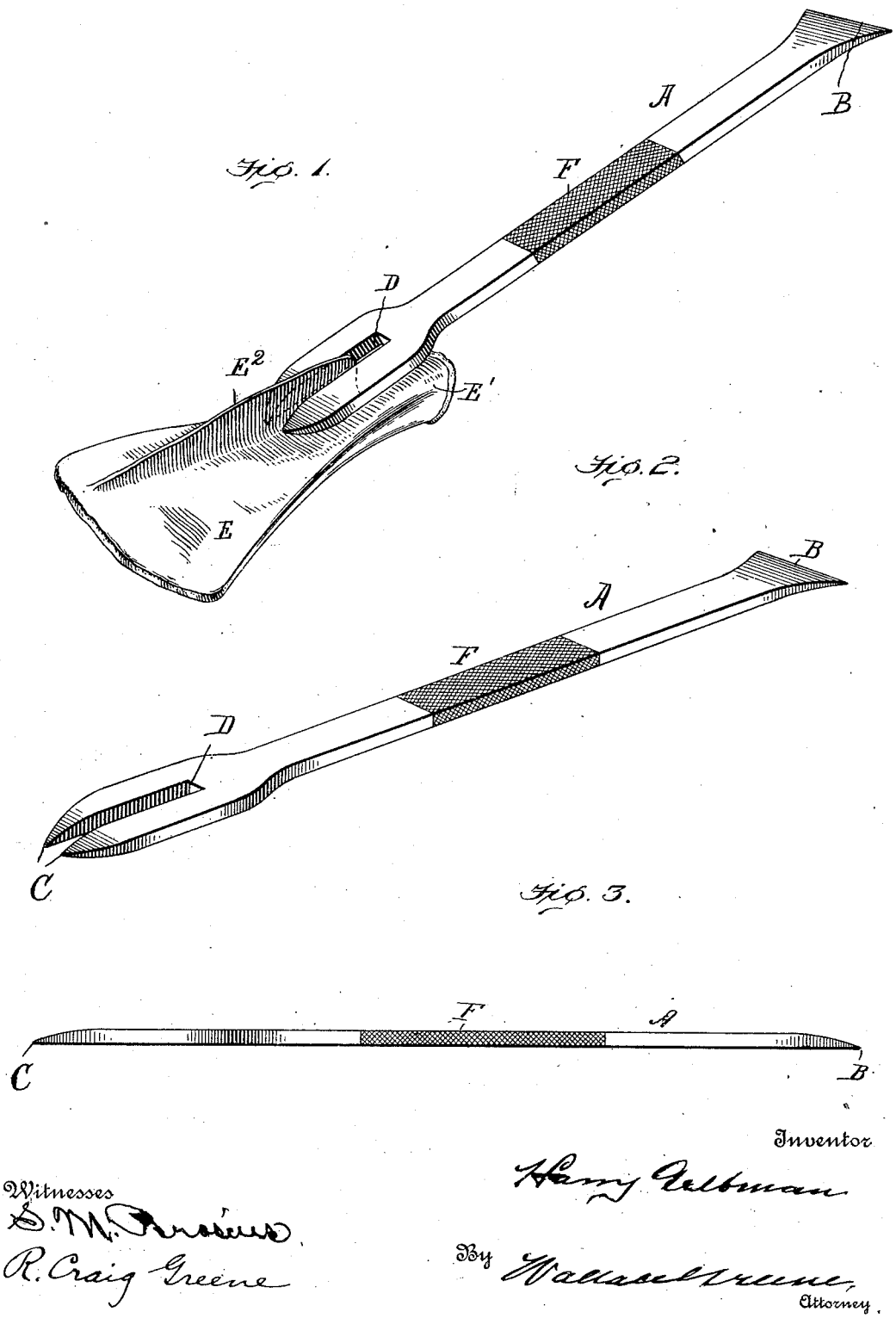

HARRY GELBMAN, OF HAMILTON, MONTANA.

MEAT-BONING IMPLEMENT.

954,084.  Specification of Letters Patent.  Patented Apr. 5, 1910.

Application filed January 11, 1910. Serial No. 537,509.

*To all whom it may concern:*

Be it known that I, HARRY GELBMAN, citizen of the United States, residing at Hamilton, in the county of Ravalli and State of Montana, have invented certain new and useful Improvements in Meat-Boning Implements, of which the following is a specification, reference being had therein to the accompanying drawing.

My invention relates to implements for removing bones from meat and the general object is to provide an implement with which bones and particularly the flat bone or blade of shoulders may be quickly and neatly removed even by the unskilled, leaving the meat nearly intact or unmutilated.

In the accompanying drawings, Figure 1 is a perspective view showing the implement in one of the positions it occupies while removing a shoulder blade, which is shown without the surrounding meat. Fig. 2 is a perspective view of the implement alone. Fig. 3 is a side or lateral edge view of the same implement.

Preferably, the implement consists of a single integral or one-piece bar of metal, and it is so shown for the purposes of illustration. The bar, whether thus integral or not, has at one end a terminal, chisel-like edge, and at the other end a peculiar sort of fork, and in use the implement is grasped between its ends, the middle portion preferably being knurled or otherwise roughened to afford a secure hold. In the drawings, this bar, A, is shown as a flat piece of steel having one plane face. One end of the bar is preferably widened and is beveled down to that face to form a sharp terminal edge B, and the opposite end portion is widened, given an approximately oval contour, beveled toward its end only, to form a cutting edge, C, and cut away perpendicularly to the plane of the bar to form a slot D extending inward from the end along the axis of the oval portion. The slot is a little wider than the usual thickness of the main portion, E, of a shoulder blade. All the angles, except at or near the middle portion of the implement are made as sharp as may be convenient.

In using the implement to remove a shoulder blade, it is grasped by the roughened middle, F, the meat is detached on all sides from the neck, E', of the bone and then the tool is reversed and its forked end is pushed inward while embracing the rib $E^2$, found on one face of this bone, the sharp terminal portions and the sharp angles adjacent to the slot serving to scrape the meat from the bone while it is lifted therefrom by reason of the inclination of the implement. In like manner the forked portion is pushed inward over each lateral margin of the bone, freeing the meat therefrom, and then with either end of the implement the meat is freed from the bone's terminal edge. The freed bone is then withdrawn through the neck opening, which is slightly widened by cutting if it be found necessary, leaving the shoulder in substantially its normal form, and practically unopened, so far as any tendency to materially open in cooking is concerned.

It is obvious that the implement may be somewhat varied in form, but I prefer to have the forked end oval, the two parts of the fork of the same length, the ends beveled to the plane face, and the scraping angles right angles.

What I claim is:

1. An implement of the class described consisting of a steel bar having all its parts in substantially the same plane, beveled to a terminal cutting edge at each end and bifurcated at one end, dividing the corresponding terminal edge, substantially as set forth.

2. An implement of the class described consisting of a steel bar beveled to a terminal cutting edge at each end and slotted inward centrally from one end, the angles adjacent to the slot and to each cutting edge being sharp, whereby they are adapted to scrape meat from a bone.

3. An implement of the class described consisting of a flat, one-piece steel bar beveled at one end to a transverse cutting edge, and having its opposite end portion rounded and provided with an inwardly extending central slot adapting this portion to pass over the marginal portions of shoulder bones, as set forth.

4. An implement of the class described consisting of a one-piece flat steel bar roughened at its middle, having one end beveled to form a terminal cutting edge, and having the opposite end portion widened to form an oval and slotted inward centrally from the terminal margin of the oval, the angles near the ends and adjacent to the slot being made sharp and approximately right angles.

In testimony whereof I affix my signature in presence of two witnesses.

HARRY GELBMAN.

Witnesses:
 JOSEF RICHTER,
 WILLY VOGEL.